United States Patent

Dorinski et al.

[11] Patent Number: 5,821,854
[45] Date of Patent: Oct. 13, 1998

[54] SECURITY SYSTEM FOR A PERSONAL COMPUTER

[75] Inventors: Dale W. Dorinski, Coral Springs; Frank M. Scutch, III, Plantation, both of Fla.

[73] Assignee: Motorola, Inc., Schaumburg, Ill.

[21] Appl. No.: 876,469

[22] Filed: Jun. 16, 1997

[51] Int. Cl.$^6$ .................................................. G08B 1/08
[52] U.S. Cl. .................. 340/539; 340/825.31; 340/573; 367/93; 367/94
[58] Field of Search ............... 340/539, 825.31, 340/825.56, 825.69, 825.72, 573; 367/93, 94

[56] References Cited

U.S. PATENT DOCUMENTS

| | | | |
|---|---|---|---|
| 4,593,273 | 6/1986 | Narcisse | 340/539 |
| 4,675,656 | 6/1987 | Narcisse | 340/539 |
| 4,791,409 | 12/1988 | Reid | 340/539 |
| 5,283,500 | 2/1994 | MacIntyre | 340/539 |
| 5,309,144 | 5/1994 | Lacombe et al. | 340/539 |
| 5,315,290 | 5/1994 | Moreno et al. | 340/568 |
| 5,339,074 | 8/1994 | Shindley et al. | 340/825.31 |
| 5,357,254 | 10/1994 | Kah, Jr. | 342/42 |
| 5,380,583 | 1/1995 | Occhiello et al. | 428/283 |
| 5,380,983 | 1/1995 | Cavada et al. | 219/250 |
| 5,396,215 | 3/1995 | Hinkle | 340/426 |
| 5,406,261 | 4/1995 | Glenn | 340/571 |
| 5,461,365 | 10/1995 | Schlager et al. | 340/573 |
| 5,510,771 | 4/1996 | Marshall | 340/573 |
| 5,552,759 | 9/1996 | Stoyka | 340/426 |
| 5,552,773 | 9/1996 | Kuhnert | 340/573 |
| 5,557,259 | 9/1996 | Musa | 340/573 |
| 5,666,010 | 9/1997 | Stratiotis | 307/328 |

*Primary Examiner*—Jeffery A. Hofsass
*Assistant Examiner*—Daryl C. Pope
*Attorney, Agent, or Firm*—Barbara R. Doutre

[57] ABSTRACT

A security system (300) for a personal computer maintains computer terminal (302) in an active mode of operation while the user is within range of the terminal. The system includes a radio (314) worn by a user (316) which generates a low level RF signal (318). As long as the user (316) remains within range of the computer (302), a receiver (312) will detect a received signal strength which maintains the computer monitor (306) in an active mode of operation. When the user (316) walks away from the computer terminal (302), the received signal strength decreases below a threshold which causes the monitor (306) to go into a lock-out condition.

12 Claims, 4 Drawing Sheets

SECURITY SYSTEM FOR A PERSONAL COMPUTER

TECHNICAL FIELD

This invention relates in general to personal computers and more specifically to the security systems for such computers.

BACKGROUND

Currently, most personal computers are equipped with some type of security program to allow authorized users to access the computer and the data resident on the hard drive, while preventing unauthorized users from operating the computer. Typically, these security programs operate by preventing the complete boot-up of a computer without entry of a password by an authorized user. Usually these prior art systems also require a user to implement one of two options in which the user either manually enters a password to cause the security program to lock-out the computer, or to preset the computer to automatically lock the computer after some predetermined length of time when there is no activity at the computer. Thus, if a user walks away from his terminal, the computer will automatically lock after, for example, two, ten, or twenty minutes.

The disadvantage with the first option is that it requires the user to actively lock the computer by entering his password every time he plans to leave the area. This is not only inconvenient but can be easily forgotten by forgetful users. The disadvantage with the second option is that, when the user walks away from the computer terminal, the computer may not lock for an extended period of time in which it is still accessible to unauthorized users. Another disadvantage with the second option is that, if the preset lock-out time is set for a relatively short time period, the computer will frequently lock-out the user while the user may still be sitting by the terminal but not actively using the terminal. This forces the user to repeatedly enter the password throughout a workday which can be extremely annoying and non-productive. FIG. 1 shows an unhappy user sitting by a computer terminal having the prior art security system. Accordingly, there is a need for an improved security system for personal computers.

DETAILED DESCRIPTION OF THE PREFERRED EMBODIMENT

Figure 1:
FIG. 1 is a prior art security system for a personal computer.

While the specification concludes with claims defining the features of the invention that are regarded as novel, it is believed that the invention will be better understood from a consideration of the following description in conjunction with the drawing figures, in which like reference numerals are carried forward.

Figure 2:
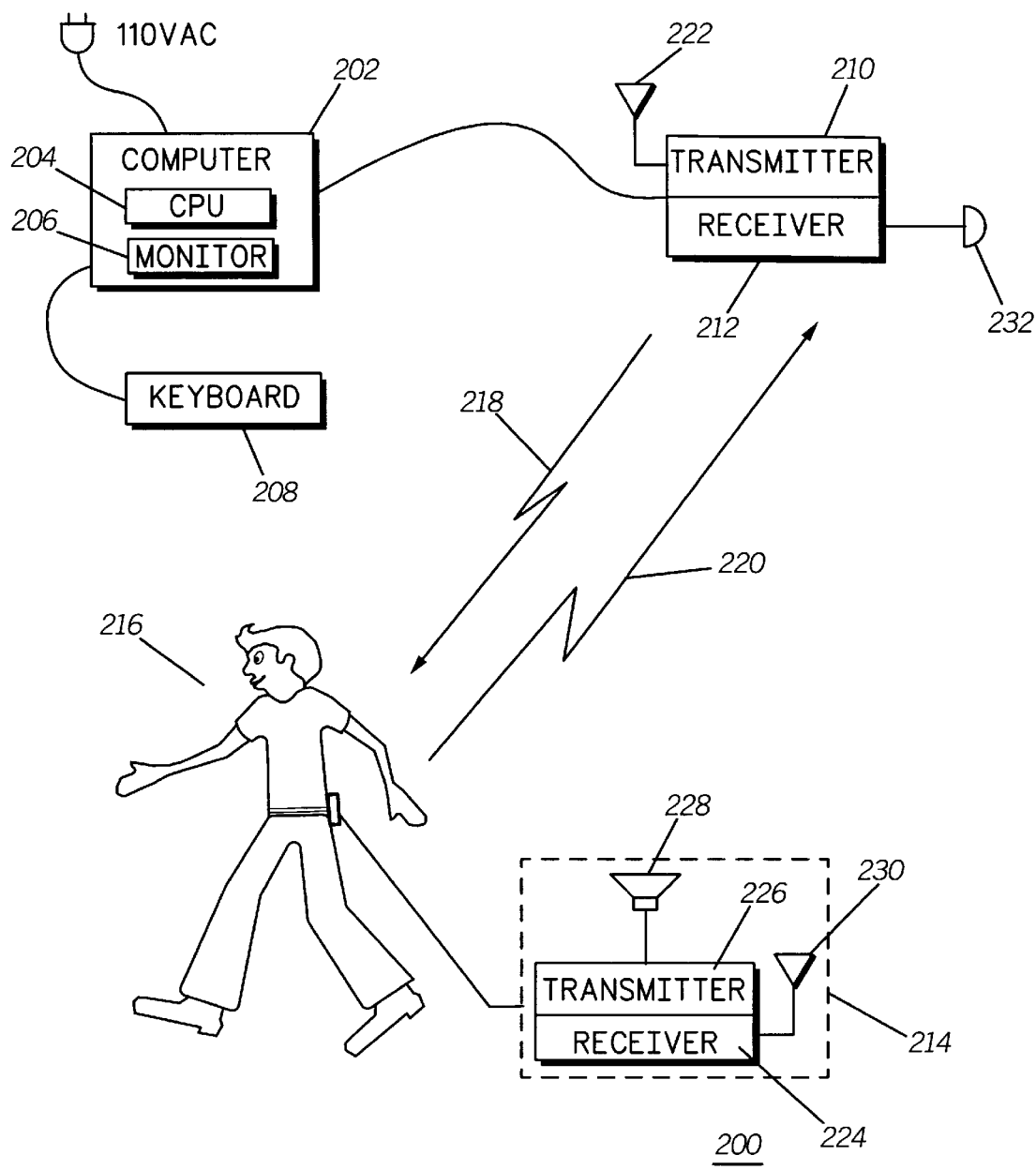
FIG. 2 is block diagram of a personal computer security system in accordance with a first embodiment of the invention.

Referring now to FIG. 2, there is shown a block diagram of a personal computer security system 200 in accordance with a first embodiment of the invention. Security system 200 includes a computer 202 having a central processing unit (CPU) 204, monitor 206, and keyboard 208. Computer terminal 202 has first and second modes of operation. The first mode of operation is an active mode (or active state) in which a user can access the computer and the data resident on the hard drive (not shown). The second mode of operation is a lock-out mode in which the monitor 206 displays a security condition preventing access to the computer's CPU and hard drive unless an appropriate password or security identifier is entered. In accordance with the first embodiment of the invention, security system 200 further includes a low power radio frequency (RF) transmitter 210 and a receiver 212 which communicate with a portable radio 214 worn by a user 216. Transmitter 210 and receiver 212 are coupled to the computer 202 either externally, as part of a security box as shown, or alternatively, transmitter 210 and receiver 212 may reside within the computer terminal itself.

In accordance with the first embodiment of the invention, a low power radio frequency (RF) signal 218 is generated at the transmitter 210 for reception by the portable radio 214. As long as the user remains within a predetermined range of the terminal, such as 2 to 3 meters, the radio 214 will detect the presence of the RF signal 218 and the computer monitor 206 will remain in the active state. Once the user 216 goes outside the predetermined range, the RF signal 218 received by radio 214 will drop below a predetermined signal strength threshold. In response to the received signal strength dropping below the predetermined threshold, the radio 214 will in-turn generate an inaudible sound 220 which will be detected by the receiver 212. Once the inaudible sound 220 is detected at receiver 212, the computer 202 enables a lock-out screen at monitor 206. This lock-out screen indicates that the computer 202 has switched to a lock-out mode requiring entry of a password or security identifier by the user.

In accordance with the first embodiment of the invention, the RF signal 218 is generated by the transmitter and is transmitted to the radio 214 via an antenna 222. Radio 214 includes a receiver 224, a transmitter 226, a transducer 228, and an antenna 230. RF signal 218 is preferably a coded RF signal. Radio receiver 224 receives the RF signal 218 through radio antenna 230 which is preferably mounted within the radio. In the first embodiment of the invention, when the RF signal 218 received by the radio 214 falls below the predetermined threshold (indicating an out of range user), the radio transmitter 226 generates the inaudible sound 220 which is transmitted via transducer 228. The inaudible sound 220 is detected by a microphone 232 coupled to the receiver 212 at the computer terminal. This inaudible sound 220 is outside the frequency range perceptible by humans (ultrasonic or infrasonic ranges) but is still detectable by the microphone 232. Microphone 232 can be selected from a wide range of available cartridges which are capable of detecting signals in the ultrasonic or infrasonic ranges, such as electret, condenser, or piezo. When the microphone 232 detects the inaudible sound 220, receiver 212 processes the signal and the computer's CPU 204 enables the lock-out mode at monitor 206.

Briefly, the following steps have been implemented in the first embodiment to provide security to a user's personal computer. The RF signal 218 is transmitted from transmitter 210 located at the computer terminal and is received at the portable radio 214. The received signal strength of the RF signal 218 is measured at the portable radio 214 and compared to a predetermined threshold. The active mode of operation is maintained at the computer terminal 202 when the received signal strength falls above the predetermined threshold. The inaudible sound 220 is transmitted from the portable radio 214 when the received signal strength falls below the predetermined threshold. The inaudible sound 220 is detected at the receiver 212 located at the computer terminal, and the computer lock-out mode of operation is enabled. A password or security code identifier is entered by the user at the computer terminal 202 to re-enable the active mode of operation after a lock-out mode of operation has been enabled.

In the first embodiment of the invention, the computer monitor 206 remains in the lock-out mode until the user returns to the terminal and enters his password or security identifier. The security system 200 of the first embodiment is well suited to the paging environment since pagers are selective call devices which already include a receiver, an audio transmitter, and an antenna. Pagers are in such wide use today that it is not at all unusual for an individual to use both a pager and a computer for both work and personal use. By implementing radio 214 as part of a pager, the user's pager can now control security lock-out of his computer terminal as well as perform regular paging functions.

Figure 3:
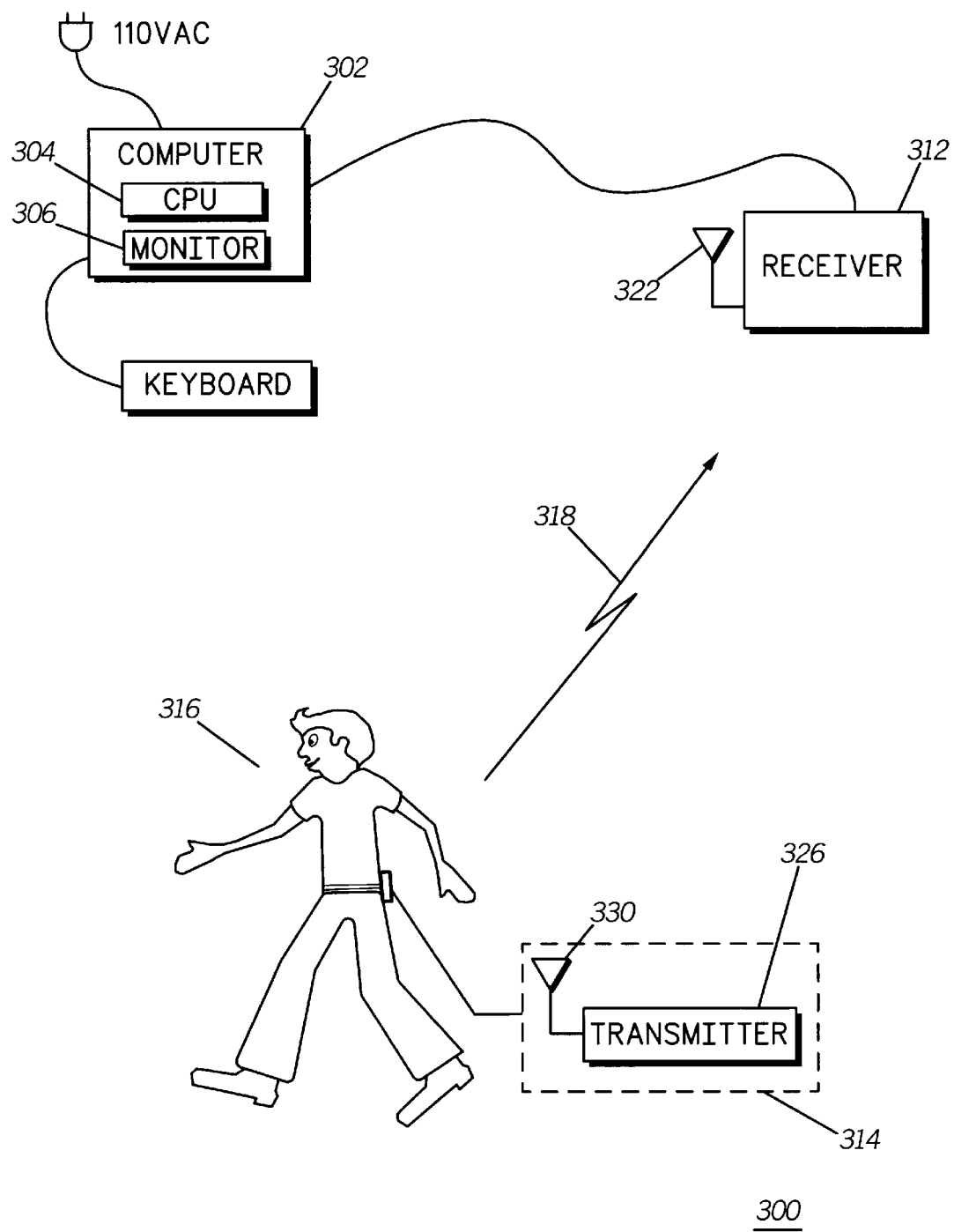
FIG. 3 is block diagram of a personal computer security system in accordance with a second embodiment of the invention.

FIG. 3 shows a second embodiment of a personal computer security system 300. In this second embodiment, a portable radio 314 worn by user 316 periodically emits a low power RF signal 318 which is received by receiver 312 coupled to the computer terminal 302. As in the first embodiment, receiver 312 can be located outside the computer terminal 302 or reside within the terminal itself. A low power RF transmitter 326 and antenna 330 are located in the radio 314 for generating the RF signal 318 and preferably operate independently of other radio circuitry. As long as the received signal strength of the RF signal 318 remains above a predetermined signal strength threshold, the computer 302 will remain in the active mode of operation. When the receiver 312 fails to receive the transmitted RF signal 318, or the signal strength falls below the predetermined threshold, a security lock-out is generated by the CPU 304 at the computer monitor 306. When the user 316 returns to his area wearing radio 314, the received signal strength of RF signal 318 increases above the predetermined threshold, and the computer will return to its active mode of operation. The advantage of this second embodiment is that the computer terminal 302 will automatically return to an active mode of operation as soon as the user returns to his area without requiring the user to re-enter a password.

Briefly, the following steps provide for the security described in the second embodiment of the invention. The radio frequency signal 318 is periodically transmitted from the portable radio 314 and received at the computer's receiver 212 where it is compared to a predetermined signal strength threshold. The lock-out mode of operation is automatically enabled when the received RF signal 318 falls below the predetermined threshold, and the active mode of operation is automatically enabled when the received RF signal falls above the predetermined threshold.

The periodic emission of RF signal 318 transmitted from the radio 314 is preferably a coded signal associated with a particular computer terminal so that nearby terminals are not affected by other users passing by. By periodically transmitting the RF signal 318 from the radio 314 and by setting the signal strength threshold at the receiver 312 to accommodate a limited range of only a few meters, low power signaling can be used so that current consumption of the transmitter 326 can be kept to a minimum.

Security system 300 can be incorporated as part of a two-way portable radio to provide the user with an additional feature of computer security. When implemented as part of a two-way radio, the low power RF transmitter 326 and antenna 330 preferably operate independently of the regular two-way radio operations. Hence, all regular two-way radio operations can continue while the radio 314 independently controls the lock-out feature of the computer 302.

Figure 4:
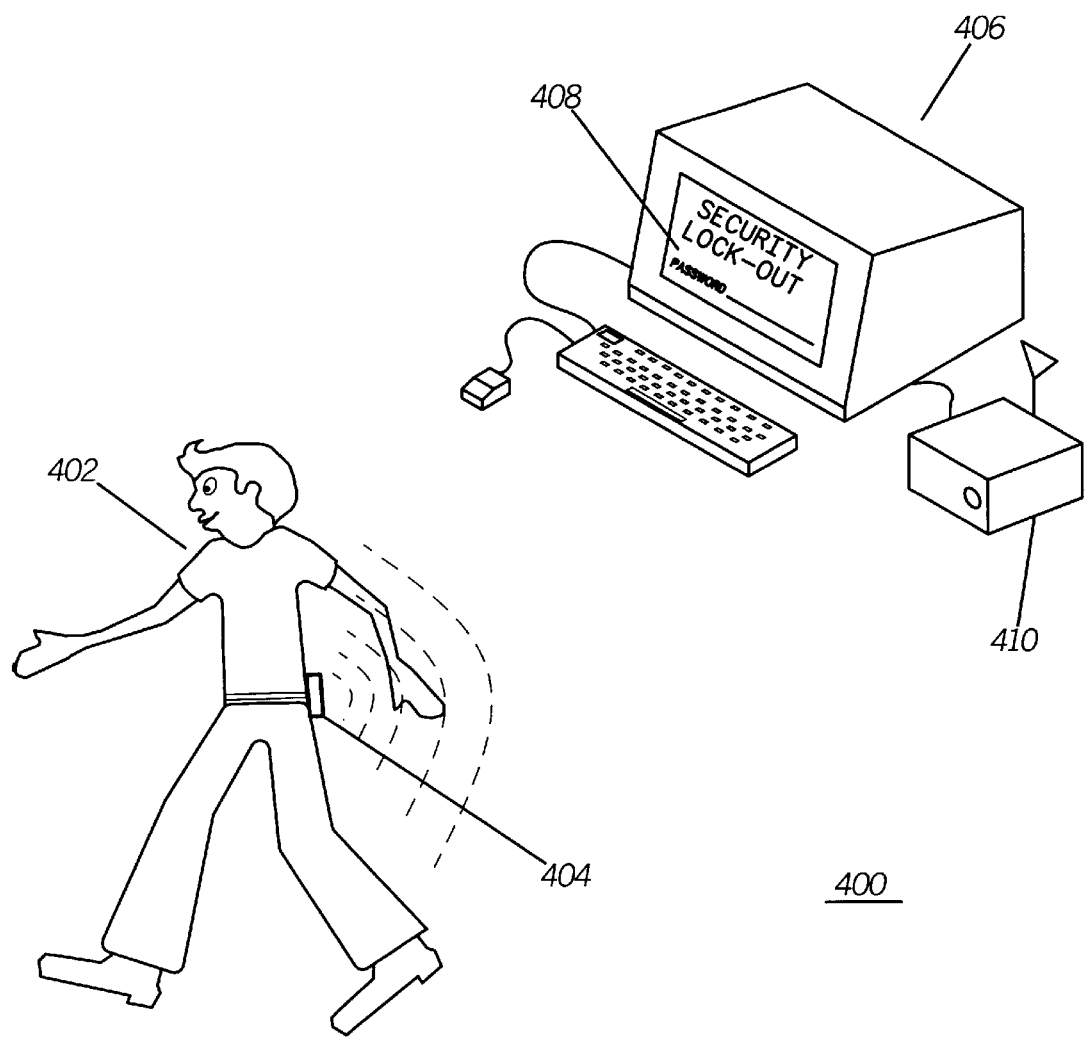
FIG. 4 is a personal computer security system in accordance with the present invention.

FIG. 4 shows a happy user 402 wearing a radio 404 and leaving his computer terminal 406 with the security lock-out enabled on the monitor 408 in accordance with the present invention. Radio 404 operates in conjunction with a security box 410 which is formed in accordance with either the first embodiment (transmitter/receiver 210/212) or the second embodiment (receiver 312) described by the invention. The personal computer security system 400 provides security to the user's computer without the disadvantage of continually having to re-enter a password or security identifier to access the computer data. The personal security system described by the invention thus allows a user to be more productive and less frustrated in the work environment.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A security system for a personal computer, comprising:
   a computer;
   a receiver coupled to the computer; and
   a radio for transmitting a radio frequency (RF) signal to the receiver of the computer, the computer enabling a security lock-out screen when the RF signal strength falls below a predetermined threshold.

2. The security system of claim 1, wherein the RF signal includes coded signaling.

3. The security system of claim 1, wherein the radio comprises a two-way portable radio.

4. A security system for a personal computer, comprising:
   a computer having an active state and a lock-out state, the computer including:
   a transmitter for generating a radio frequency (RF) signal;
   an antenna for transmitting the RF signal;
   a microphone for detecting an inaudible sound, the computer remaining in an active state until an inaudible sound is detected; and
   a radio for receiving the RF signal and generating the inaudible sound in response to the RF signal falling below a predetermined threshold, the computer entering the lock-out state when the microphone detects the inaudible sound.

5. The security system of claim 4, wherein the radio comprises a pager.

6. A security system for a personal computer, comprising:
   a radio worn by a user, the radio generating a radio frequency (RF) signal; and
   a computer terminal having an active mode of operation and a lock-out mode of operation, the computer including a receiver for receiving the RF signal, the computer remaining in the active mode of operation when the received RF signal falls above a predetermined threshold, the computer going into the lock-out mode of operation when the received RF signal falls below the predetermined threshold, and the computer automatically returning to the active mode of operation when the received RF signal returns above the predetermined threshold.

7. The security system of claim 6, wherein the RF signal is transmitted periodically.

8. The security system of claim 7, where the wherein the RF signal is a coded signal.

9. A security system for a user's personal computer, comprising:

a portable radio worn by the user, the portable radio for transmitting radio frequency (RF) signals;

a computer capable of detecting the RF signals within a predetermined range of the computer; and wherein the computer automatically enables a lock-out mode of operation when the radio is outside of the predetermined range, and the computer automatically enables an active mode of operation when the radio is within the predetermined range.

10. A method of providing security to a personal computer, comprising the steps of:

transmitting a radio frequency (RF) signal from a computer terminal;

receiving the RF signal at a portable radio;

measuring the received signal strength of the RF signal;

comparing the received signal strength to a predetermined threshold;

maintaining an active mode of operation at the computer terminal when the received signal strength falls above the predetermined threshold;

transmitting an inaudible sound from the portable radio when the received signal strength falls below the predetermined threshold;

detecting the inaudible sound at the computer terminal; and enabling a computer lock-out mode of operation when the inaudible sound is detected.

11. The method of claim 10, further comprising the step of entering a password at the computer terminal to re-enable the active mode of operation after a lock-out mode of operation has been enabled.

12. A method of providing security to a personal computer, comprising the steps of:

periodically transmitting a radio frequency (RF) signal from a portable radio;

receiving the RF signal at the personal computer;

comparing the received signal strength of the RF signal to a predetermined threshold;

automatically enabling a lock-out mode of operation when the received RF signal falls below the predetermined threshold; and automatically enabling an active mode of operation when the received RF signal falls above the predetermined threshold.

* * * * *